3,634,231
TREATMENT OF SEWAGE DIGESTER
SUPERNATANT LIQUOR
Maria G. Dunseth, Wilmette, and Joel J. Brinkman, Wauconda, Ill., assignors to the United States of America as represented by the Administrator of the Environmental Protection Agency
No Drawing. Filed May 13, 1970, Ser. No. 37,045
Int. Cl. C02c 1/40
U.S. Cl. 210—56                                     7 Claims

ABSTRACT OF THE DISCLOSURE

Process for removal of 80 weight percent or more of the total phosphorus of digester supernatant liquor from the conventional sewage sludge digestion process comprising heating the digester supernatant liquor for at least about 5 minutes at a temperature in the range of from about 40° centigrade to about 80° centigrade at ambient pressure or below ambient pressure when the temperature is about 55° centigrade or higher and in the range of from about 28 inches of mercury (absolute) or below when the temperature is below about 55° centigrade; and then separating precipitated solids. The process also results in substantial reduction of total nitrogen, chemical oxygen demand and biological oxygen demand of the digester supernatant liquor.

---

This invention relates to the treatment of digester supernatant liquor (hereinafter "DSL") from sewage treatment processes, especially from the conventional sewage sludge digestion process and, in particular, to a process for removing at least about 80 weight percent of the total phosphorus values therein and for the concurrent substantial reduction of total nitrogen, chemical oxygen demand (hereinafter "COD") and biological oxygen demand (hereinafter "BOD").

Industrial and domestic sewage wastes are commonly treated by activated sludge processes. Usually the raw sewage is subjected to a preliminary treatment which includes settling and removal of a primary sludge portion. The effluent from the primary treatment is then treated in aeration basins in which the organic waste is partially oxidized and partially synthesized into microbial cells. The microorganisms, such as bacteria and protozoa, which develop during the aeration tend to flocculate into suspended clumps or masses. From the aeration basin, the sewage is discharged into a secondary sedimentation basin where the flocculated microorganism masses, along with other suspended solids, settle to form a sludge. It is conventional to recycle a portion of this biologically active sludge to the aerator basins in order to serve as an inoculum for the incoming raw sewage. Sludge from the primary stage and from the activated sludge process may proceed to a digester for further processing by anaerobic digestion.

While this process results in a substantial reduction in chemical oxygen demand of the sewage treated, it is not effective to remove dissolved mineral constituents such as phosphorus. Phosphates, along with nitrates, are one of the major factors contributing to progressive stream and lake fertilization. Fertilization of the receiving waters tends to promote blooms in aquate vegetation, particularly algae. Such blooms seriously degrade the quality of water and may even prove toxic to other aquatic life. When algae die and settle in the water, they increase the total organic load and consume oxygen in the water. The ultimate development of blooms is limited by the availability of nutrients, especially nitrogen and phosphorus. Thus, reduction of available phosphorus, nitrogen, or both results in a limitation on undesirable algae growth.

Phosphorus in domestic sewage is derived from organic wastes and from chemical sources; particularly from phosphate-containing detergents. Removal of phosphate from sewage can be accomplished in various ways. The two main approaches to such removal are by biological synthesis and by chemical treatment such as precipitation of phosphorus in an insoluble compound. In the case of biological synthesis, conversion of phosphorus to cellular material is optimized by rigorous control of conventional operating parameters or by a tertiary treatment of the sewage plant effluent such as by algae culture in a lagoon. Chemical removal of phosphorus is often accomplished by precipitation as the phosphate using aluminum, iron, calcium or magnesium salts as the precipitating agents. Usually such removal is performed as tertiary treatment of the sewage plant effluent.

DSL is a natural by-product of the conventional sewage sludge digestion process. As new or "raw" sludge is pumped into the digester and mixes with the older digesting sludge, an equivalent volume of the liquid in the digester that contains the least amount of suspended solids must be pumped out. The recent interest in nutrient control has resulted in considerable concern with respect to the levels of phosphorus in DSL. The amount of total phosphorus in DSL is primarily a function of the suspended solids present; whereas the orthophosphate concentration is more closely related to the type of sludge digested and the nature of the digester operation. Studies of various DSL's have shown that total phosphorus (as P) may range as high as about 300 milligrams per liter. More typically, total phosphorus (as P) ranges from about 25 to about 125 milligrams per liter. It is usually found that of the total phosphorus in any given DSL, about 60 to about 85 weight percent is in the orthophosphate form.

The troublesome nature of DSL has been discussed in Kappe, "Digester Supernatant Problems, Characteristics and Treatment," Sewage and Industrial Wastes, vol. 30, #7, p. 937 (1958), wherein the author points out the disadvantages of returning supernatant to the head of the waste treatment plant (which is still widely practiced today).

Many of the processes proposed in the prior art for reducing orthophosphate in waste treatment plant effluents result in the extracted phosphorus being concentrated in the digester. Anaerobic release occurs in the digester and converts much of the phosphorus to soluble orthophosphate. Unless this increased orthophosphate can be removed prior to recycle of the DSL back to the treatment plant, these phosphate removal processes would not be continually effective. Therefore, removal of phosphorus from digester supernatant has become extremely important.

All known previously proposed processes for removal of phosphate are based upon precipitation of the phosphate as an insoluble salt by the addition of cations such as aluminum, ferrous and ferric iron, copper, magnesium, calcium or the like in the form of soluble salts such as, e.g., alum, lime, magnesia, calcium chloride and so forth. However, these chemical precipitation processes are not found to be as attractive in actual practice as they might appear, since it is normally necessary to use large stoichiometric excesses of the precipitating cation to achieve desired phosphate removals of 80 or 90 percent or more. This obviously greatly increases the cost of the processes. It has been calculated that chemical costs, alone, in such processes range from $10 to $40 per million gallons of waste water treated.

It is an object of this invention to provide a process for removal of phosphorus from DSL.

It is another object of this invention to provide a process for removal of phosphorus from DSL, which process does not require, except perhaps in rare instances, the addition of any precipitating chemicals.

Still further objects, and the many advantages, of the present invention will be apparent from the following more detailed description thereof.

Briefly, it has been found that 80 weight percent or more of the total phosphorus in DSL from the conventional sewage sludge digestion process can be removed by merely heating the DSL for at least about 5 minutes at temperatures in the range of from about 40° to about 80° centigrade and at pressures below about 28 inches of mercury (absolute) when the temperature is below about 55° centigrade; and then separating precipitated solids.

The time of heating in the present process may range up to 180 minutes or more. Preferably, the DSL is heated for a time of from about 30 minutes to about 120 minutes, e.g., 60 minutes. Treatment times in excess of about 120 minutes do not usually afford any significant increase in the percent of total phosphorus removed.

The treatment temperature in the process of this invention must be at least about 40° centigrade. Preferably, the temperature is between about 60° and about 75° centigrade, e.g., 65° centigrade.

When the treatment temperature is about 55° centigrade or below, the treatment must, in the presently preferred embodiment of the invention, be conducted under at least a slight vacuum in order to achieve the desired level (i.e., 80 weight percent or more) of phosphorus removal. Treatment pressures below about 28 inches of mercury (absolute), e.g., about 25 to about 28 inches of mercury (absolute), and most preferably about 27 inches of mercury (absolute), have been found satisfactory. At temperatures above about 55° centigrade the treatment may be conducted at ambient pressures if desired. Preferably, however, pressures slightly below ambient and within the ranges specified above are used even at the higher treatment temperatures in order to obtain the greatest possible removal of phosphorus.

In most instances the process of the invention does not require additional chemicals because the DSL already contains a sufficiently high concentration of magnesium and calcium ions to precipitate all the soluble phosphate. In areas where the water is soft, i.e., where the normal hardness is below that stoichiometrically needed to precipitate the phosphate, relatively small amounts of supplemental magnesia are added.

While it is not intended to be bound by any particular theory of operation, it is believed that the process of the present invention results in the decomposition of ammonium bicarbonate normally present in DSL with a consequent increase in alkalinity and resulting precipitation of phosphate in the DSL as magnesium ammonium phosphate, $MgNH_4PO_4 \cdot 6H_2O$, and magnesium phosphate, $Mg_3(PO_4)_2 \cdot 4H_2O$. If the DSL contains a high concentration of soluble calcium the precipitate will also include some calcium phosphate, $Ca_3(PO_4)_2$. The pH of the DSL under treatment should be increased to 8.5 to 8.9 for optimum phosphate removal. A high degree of agitation is desirable to expose a large surface area and enhance $CO_2$ evolution. Evolution of $CO_2$ is also enhanced by operating under slightly reduced pressures in accordance with the preferred embodiment of the invention. Alternately, the DSL under treatment may be sparged with air or an inert gas to enhance the evolution and/or removal of $CO_2$.

It will be understood that the time, temperature and pressure of treatment will be at least partially dependent upon each other. Thus higher treatment temperatures and/or lower tretament pressures will usually permit shorter treatment times in which to achieve the desired results. On the other hand, lower treatment temperatures and/or higher treatment pressures will usually require longer treatment times.

It has also been observed that the concentration of carbon dioxide (and thus the ammonium bicarbonate) in the DSL will have an effect on other treatment variables. Higher concentrations of ammonium bicarbonate in the DSL (corresponding, e.g., to $CO_2$ concentrations of about 2500 up to 4000 milligrams per liter) exert a strong buffering effect. As a result greater energy input (that is, higher treatment temperatures and/or lower treatment pressures) and/or longer treatment times will be called for to decompose the ammonium bicarbonate and to evolve sufficient amounts of carbon dioxide to reach a pH in the desired range. When the ammonium bicarbonate concentration is lower (corresponding, e.g., to $CO_2$ concentrations in the range of about 1000 to 1800 milligrams per liter), less energy input and/or shorter treatment times will suffice to give the desired results. With typical average ammonium bicarbonate concentrations (corresponding to $CO_2$ concentrations on the order of 1800 to 2500 milligrams per liter) intermediate processing conditions will usually apply.

A person having ordinary skill in the art will be readily able to determine the requisite treatment conditions necessary for processing of any given DSL in accordance with the present invention and within the parameters discussed above after a few routine experimental runs.

To separate precipitated solids, the treated DSL is pumped into a continuous centrifuge or a conventional settler. The solids are dried in a rotary dryer and may be used for fertilizer purposes. As an alternative, a fraction of the solids prior to drying may be recycled to the reactor to increase the percent solids in the DSL and enhance crystal growth.

The process of this invention not only results in high removal of phosphorus from DSL but also gives the added advantage of significant reduction in total nitrogen (as N), COD and BOD of the DSL.

The invention will be further understood after referring to the following specific but non-limiting examples. The DSL used in the examples was obtained from the sewage treatment plant in Libertyville, Ill. The average composition of this DSL in milligrams per liter, determined from analysis of samples taken approximately bi-weekly over a one-year period, is as follows:

| | |
|---|---:|
| Total solids | 2,700 |
| Suspended solids | 740 |
| Total phosphorus (as P) | 100 |
| Orthophosphate (as P) | 60 |
| Chemical oxygen demand | 1,230 |
| pH | 7.0 |
| Alkalinity (as $CaCO_3$) | 1,450 |
| Total kjeldahl nitrogen (as N) | 360 |
| Calcium (as Ca) | 100 |
| Magnesium (as Mg) | 65 |

Slight variations from the foregoing averages are indicated in the examples.

EXAMPLE 1

A two liter sample of DSL from the Libertyville, Ill. sewage treatment plant, containing 120 parts per million ("p.p.m.") calcium, 100 p.p.m. magnesium, 80 p.p.m. total phosphorus (as P), 70 p.p.m. orthophosphate( as P), and 330 p.p.m. total nitrogen (as N), was heated at ambient pressure to 65° centigrade. The sample was agitated by stirring with a stirrer revolving at approximately 1000 r.p.m. and held under the stated conditions for a period of two hours. The pH was observed and it rose from pH 7.0 to pH 8.8. The liquor was centrifuged and the resulting liquid was analyzed. 95% of the total phosphate and 77% of the total nitrogen had been removed from the liquor. The BOD was reduced from 227 to 130 milligrams per liter. The COD was reduced from 560 to 364 milligrams per liter. The solids recovered were analyzed and they contained 19.5% $P_2O_5$ all in an available form to plants.

EXAMPLES 2–6

Following the procedure outlined in Example 1, further samples of DSL were treated at ambient pressure and and under other conditions as shown in the following Table I, with results as shown in the table.

TABLE I.—EXAMPLES 2–6

| Example | Temperature (centigrade), degrees | Treatment time (minutes) | Phosphorus (p.p.m.) Original | Phosphorus (p.p.m.) Final | Final pH | Percent Phosphorus removal |
|---|---|---|---|---|---|---|
| 2 | 75 | 60 | 71.0 | 2.6 | 8.9 | 96.3 |
| 3 | 70 | 120 | 71.0 | 3.6 | 8.4 | 94.9 |
| 4 | 65 | 120 | 71.0 | 1.6 | 8.4 | 97.7 |
| 5 | 65 | 60 | 58.3 | 3.5 | 8.9 | 94.0 |
| 6 | 70 | 180 | 73 | 3 | 8.9 | 95 |

EXAMPLES 7–11

Following the procedure outlined in Example 1, further samples of DSL were heated to the temperature specified in Table II and then a vacuum, developed by an aspirator, 27 inches of mercury (absolute), was applied to the reactor. These conditions were maintained for the times shown in Table II, with the results as also shown in the table.

TABLE II.—EXAMPLES 7–11

| Example | Temperature (centigrade), degrees | Reaction time (minutes) | Phosphorus (p.p.m.) Original | Phosphorus (p.p.m.) Final | Final pH | Percent phosphorus removal |
|---|---|---|---|---|---|---|
| 7 | 40 | 60 | 71.0 | 14.2 | 8.9 | 80.0 |
| 8 | 50 | 30 | 71.0 | 12.4 | 8.5 | 82.5 |
| 9 | 40 | 60 | 58 | 9 | 8.4 | 84 |
| 10 | 65 | 60 | 60 | 1 | 9.3 | 98 |
| 11 | 65 | 60 | 56 | 1 | 9.3 | 98 |

EXAMPLES 12–13

The process was also tested in a continuous system. A 4-liter reactor, fitted with a high speed agitator and a heating mantle, was used. The DSL was pumped continuously at a rate calculated to give a 2-hour residence time in the reactor. Two continuous runs were performed, at 70° C. and 65° C. and at ambient pressure in each instance. The removal of phosphate averaged 90% and 87%, respectively. It was difficult to maintain a steady temperature during these runs because the heater control was not adequate. It is expected that a higher phosphate removal, such as that obtained in the batch experiments, would be achieved under equilibrium conditions.

EXAMPLES 14–17

The following Table III shows analyses of DSL treated with heat or heat and vacuum under different operating conditions. From the data it may be concluded that a treatment at 65° C. with or without vacuum yields a treated DSL substantially cleaner than the original DSL. Two of the most detrimental impurities, phosphorus and nitrogen, can be reduced to very low concentrations.

TABLE III.—ANALYSIS OF DIGESTER SUPERNATANT LIQUOR TREATED WITH HEAT OR HEAT AND VACUUM

| Example Number | 14 | 15 | 16 | 17 |
|---|---|---|---|---|
| Conditions: | | | | |
| Temperature (degree centigrade) | 40 | 65 | 65 | 65 |
| Pressure (27″ Hg, absolute) | Yes | (¹) | Yes | Yes |
| Retention time (minutes) | 60 | 120 | 60 | 60 |
| Analysis of treated DSL ²: | | | | |
| Total phosphorus | 9 | 4 | 2 | 2 |
| Orthophosphate | 9 | 4 | 1 | 1 |
| BOD | 134 | 86 | | |
| COD | 268 | 340 | 139 | 214 |
| Total nitrogen | 319 | 45 | 8 | 16 |

¹ No (ambient).
² All values in milligrams per liter.

While the invention has been specifically exemplified in the foregoing representative examples as applied to the treatment of DSL from a typical sewage digestion treatment plant, it will be understood that it may also be applied to sewage liquor effluents from other treatments, e.g., the liquor effluent from plants having only a primary treatment stage and/or the liquor effluent from sewage treatment plants employing the treatment process commonly known as the tickling filter process.

What is claimed is:

1. Process for removal of about 80 weight percent or more of the total phosphorus in a digester supernant liquor which consists essentially of maintaining the said liquor for at least about 20 minutes at a temperature of from about 40° to about 80° centigrade and at ambient pressure or below when the temperature is about 55° centigrade or above, or at a pressure of about 28 inches of mercury or below when the temperature is less than about 55 centigrade; in order to decompose ammonium bicarbonate and increase the pH of the liquor, and then separating the resulting precipitated solids.

2. Process as defined in claim 1 wherein the treatment temperature is between about 60° and about 75° centigrade.

3. Process as defined in claim 2 wherein the treatment time is about 30 to about 120 minutes.

4. Process as defined in claim 2 wherein the treatment pressure is about 28 inches of mercury (absolute) or below.

5. Process as defined in claim 4 wherein the treatment time is about 60 minutes.

6. Process as defined in claim 5 wherein magnesia is added prior to treatment if required to supply any deficiency between hardness ions already present in the liquor and the stoichiometric amount of hardness ions theoretically required to precipitate the phosphorus in the liquor as orthophosphate salts of such hardness ions.

7. Process as defined in claim 1 wherein the treatment time, temperature and pressure are adjusted to provide a pH of the liquor of 8.5 to 8.9.

References Cited

UNITED STATES PATENTS 1,963,581   6/1934   Heukelekian _____ 210—12

MICHAEL ROGERS, Primary Examiner